Aug. 30, 1938.   H. J. MURPHY   2,128,730
FASTENER MEMBER AND FASTENER INSTALLATION
Filed July 8, 1937   2 Sheets-Sheet 1

Inventor:
Howard J. Murphy
by Walter J. Jones
Att'y.

Aug. 30, 1938.   H. J. MURPHY   2,128,730
FASTENER MEMBER AND FASTENER INSTALLATION
Filed July 8, 1937   2 Sheets-Sheet 2
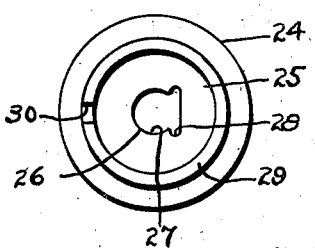
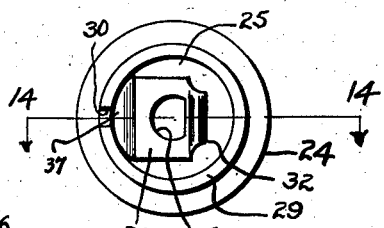
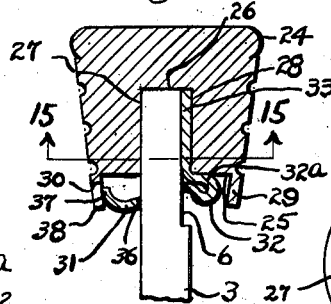
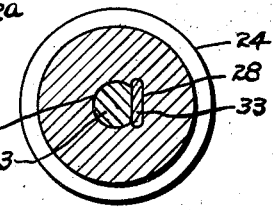
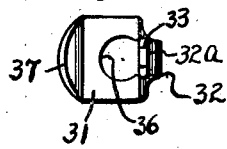
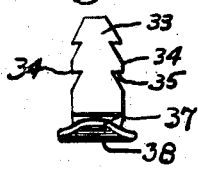
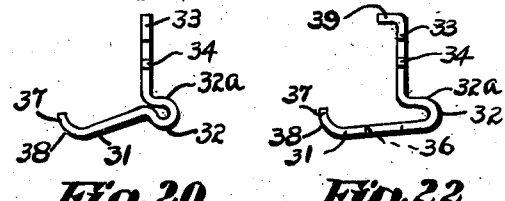
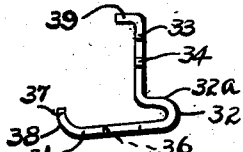
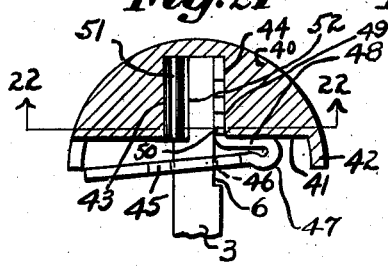
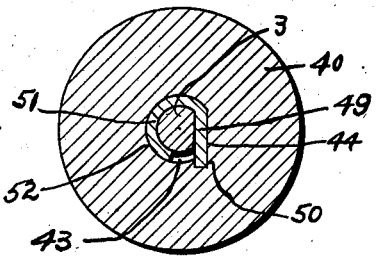
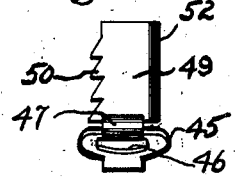
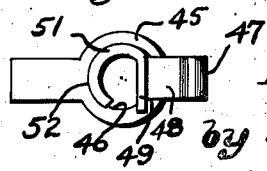
Inventor:
Howard J. Murphy.
by Walter S. Jones Att'y.

Patented Aug. 30, 1938

2,128,730

UNITED STATES PATENT OFFICE 2,128,730

FASTENER MEMBER AND FASTENER INSTALLATION

Howard J. Murphy, Greenwood, Mass., assignor to United-Carr Fastener Corporation, Cambridge, Mass., a corporation of Massachusetts Application July 8, 1937, Serial No. 152,581

12 Claims. (Cl. 287—53)

My invention relates to knob and the like fastening installations and fastener members for the same.

Reference is hereby made to my divisional applications Serial Nos. 191,234 and 191,235, filed February 18, 1938.

Referring to the drawings, in which I have illustrated preferred forms of my invention:

Fig. 12 is a bottom view of a knob member before attachment of my third form of fastener member thereto;

Fig. 13 is a bottom view similar to that of Fig. 12 showing my third form of fastener member assembled with the knob member;

Fig. 14 is a section taken on the line 14—14 of Fig. 13 and showing a shaft secured to the knob by means of my fastener member;

Fig. 15 is a section taken along the line 15—15 of Fig. 14;

Fig. 16 is a top view of my third form of fastener member per se;

Fig. 17 is an end view of the fastener member shown in Fig. 16;

Fig. 18 is a side view of the fastener members shown in Figs. 16 and 17;

Fig. 19 is a side view of a slightly modified form of my third form of fastener member;

Fig. 20 is an end view of the fastener member shown in Fig. 19;

Fig. 21 is a section through a knob installation with a fourth form of fastener member and a shaft shown in full;

Fig. 22 is a section taken along the line 22—22 of Fig. 21;

Fig. 23 is an end view of my fourth form of fastener member; and

Fig. 24 is a top view of the fastener member shown in Fig. 23.

Figure 1:
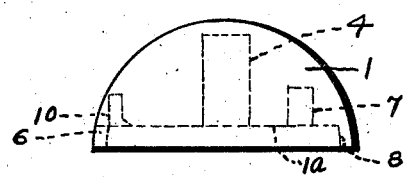
Figure 1 is an edge view of a knob member before attachment of my first form of fastener member thereto.
Figure 2:
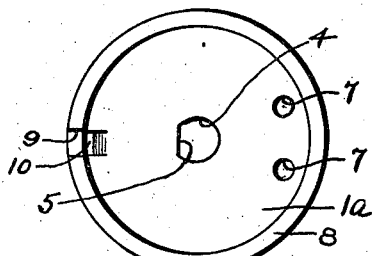
Fig. 2 is a bottom view of the knob member shown in Fig. 1.
Figure 3:
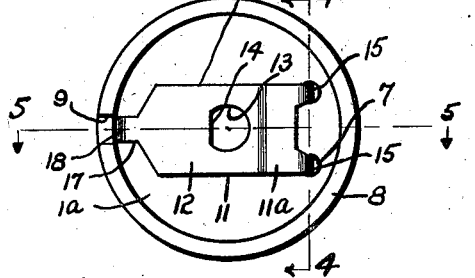
Fig. 3 is a view of the knob member similar to that of Fig. 2 with my first form of fastener member assembled therewith.
Figure 4:
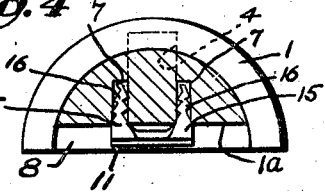
Fig. 4 is a section taken along the line 4—4 of Fig. 3.

An object of my invention is the provision of simple and inexpensive fastener members adapted for quick and easy assembly with an operating member which may be any article of manufacture, such as a rotatable knob, so as to enable a shaft to be detachably secured to an article. A principal feature of my invention is embodied in the relative constructions of the article of manufacture and the fastener members of the respective installations enabling the fastener members to be fixedly secured to the articles of manufacture in proper position for efficient operation in a manner requiring a minimum amount of time and labor.

For purposes of illustration I have chosen to combine my fastener members with knob members such as may be used on radio dial panels or automobile instrument panels, but it is understood that I do not wish to limit the use of my fastener members to articles of manufacture of the type illustrated and described because my fastener members are equally adaptable to use with other articles of manufacture as will be understood from inspection of the drawings and the description hereinafter set forth.

Referring to the installation shown in Figs. 1-5, the article of manufacture with which I have chosen to illustrate my invention is in the form of a knob member 1. My first form of fastener member 2 is secured in a recess to one end of the knob and provides efficient means for securing a shaft member 3 (Fig. 5) to the knob. The shaft 3 may be of a type commonly used in radio and automobile manufacture for connecting parts of apparatus with finger operative knob means which may be disposed in operating position on a dial or instrument panel.

The knob 1 is preferably formed of a plastic substance such as Bakelite, tenite or the like and has an opening in the form of a bore 4 in the center of an end 1ª thereof which is adapted to receive and support an end of the shaft 3 so as to maintain the shaft 3 in proper position to be gripped by the fastener member, as will be hereinafter described. The bore 4 has a flat side 5 (Fig. 2), in my preferred form, cooperating with a flat side 6 of the shaft 3 whereby the end of the shaft 3 may be fitted more snugly within the bore so as to reduce to a minimum the play between the parts. As it may not be practical to provide an irregular-shaped bore in an article other than one of such material that said bore may be formed inexpensively by a molding process, I do not wish to be limited by the particular cross-sectional shape of the bore illustrated and described because proper operation of the parts of the installation may be carried out if the bore in the body of the article is of a circular shape. A pair of openings 7 (Figs. 2 and 4) are formed in the end 1ª of the knob 1 in spaced relation to the bore 4 with each of the openings 7 spaced one from another. The openings 7 are adapted to receive attaching portions of the fastener member 2 for securing the fastener to the knob. As a means for concealing my fastener member so as to improve the appearance of the knob, I have preferably provided a recess surrounded by a peripheral flange 8 extending from the end 1ª axially of the knob member. The flange 8 has an opening 9 in one side thereof (Figs. 2, 3 and 5), in my preferred form, to permit entrance of a tool through the flange for engagement with a releasing portion of my fastener member, as will be described. An opening 10 (Fig. 5) is preferably formed in the end of the knob near the opening 9 in the flange 8 for receiving a free end of the releasing portion.

Figure 5:
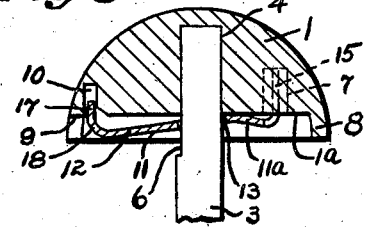
Fig. 5 is a section taken along the line 5—5 of Fig. 3 with a shaft shown in elevation.
Figure 6:
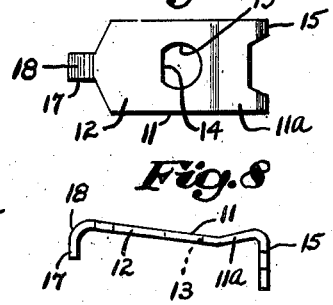
Fig. 6 is a plan view of my first form of fastener member per se.
Figure 7:
Fig. 7 is an edge view of the fastener member shown in Fig. 6.
Figure 8:
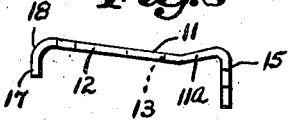
Fig. 8 is an end view of my first form of fastener member per se.

My first form of fastener member, shown most clearly in Figs. 6, 7 and 8 of the drawings, is formed of one piece of sheet metal material. The fastener member has a spring plate portion 11 of substantially rectangular shape comprising a substantially straight portion 11ª and an inclined portion 12 formed as a continuation of the portion 11ª. The inclined portion 12 has an aperture 13 for receiving an end of the shaft 3 and is so constructed that in expanded position it may grip the shaft by canting action. For proper operation of my fastening device the area of the aperture 13 should be no greater than is necessary for allowing an end of the rod to pass therethrough, as will be hereinafter more fully described. It will be noticed that the aperture 13 has a flat side 14 (Figs. 3 and 6) which cooperates with the flat side 6 of the shaft 3 for preventing relative rotation of the parts when the same are in fastened relation. As a means for attaching my fastener member to the knob I have provided attaching portions in the form of prongs 15 integral with an end of the plate 11 and extending in angular relation to the same. Each of the prongs 15, in my preferred form, has teeth 16 on opposed edges presenting shoulders facing in the direction of the base 11 to affix the fastener member more securely to the knob. The distance between the outermost free ends of the teeth on opposed edges of the prongs 15 is preferably slightly greater than the diameter of the openings 7 so that the teeth of the prongs may engage the material of the body of the knob adjacent the respective openings 7 after the prongs have been inserted therein. At the opposite end of the plate 11 from that with which the prongs 15 are integral I have provided an ear-like releasing portion 17. The releasing portion 17 extends out of the normal plane of the base 11 on the same side of the base 11 as the prongs 15 and has a substantially bowed construction providing a camming surface 18 for a purpose to be described. When the inclined portion 12 is in normal expanded position, the free end of the releasing portion extends part way into the opening 10 in the end 1ª, as most clearly shown in Fig. 5.

In assembling the parts of my installation together I first move the fastener member 2 toward the knob so that the free ends of the prongs 15 enter open ends of the openings 7. Then pressure is exerted upon the fastener so as to force the prongs into the openings until the portion 11ª of the plate 11 abuts material of the end wall 1ª of the knob member (Fig. 5). When the prongs 15 are fully inserted within the opening 7, the teeth 16 engage material of the knob 1 adjacent the respective openings 7 (Fig. 4) preventing ready removal of the prongs therefrom. When the fastener member 2 is in attached position, as shown in Fig. 5, the opening 13 will be slightly out of alignment with the opening of the bore 4.

Attachment of the shaft 3 to the knob through means of my first form of fastener member is illustrative of the general way by which shafts may be connected to knobs by other forms of fastener members which fall within the scope of my present invention and is carried out in a relatively easy manner through extending an end of the shaft 3 through the aperture 13 of the inclined plate portion 12 into the bore 4. During passage of an end of the shaft 3 through the aperture 13, the pressure of the shaft causes the inclined plate portion 12 to move toward the end 1ª whereby the aperture 13 is brought into alignment with the opening of the bore 4 permitting passage of the shaft through the aperture 13 until the outermost end of the shaft abuts material of the knob at the closed end of the bore 4. When pressure on the shaft 3 for moving it through the inclined plate portion 12 is released, the natural resiliency of the plate 11 causes the inclined portion 12 to expand whereby material of the inclined portion adjacent the aperture 13 engages the shaft in a spring grip. To detach the shaft member from the knob it is necessary simply to move a suitable tool through the opening 9 of the flange 8 of the knob member into engagement with the camming surface 18 of the releasing portion 17. As a result, the releasing portion 17 will be started downwardly toward the closed end of the opening 10. Then the plate portion 12 is forced by the tool toward the end 1ª of the knob thereby moving the aperture 13 of the inclined portion 12 into substantial alignment with the open end of the bore 4 so that the shaft may be readily separated from the knob. Thus the shaft may be detached from the fastener member even though the free edge of the flange 8 lies adjacent a surface of a panel or the like part.

Figure 9:
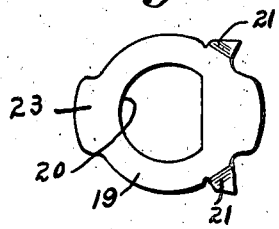
Fig. 9 is a plan view of my second form of fastener member.
Figure 11:
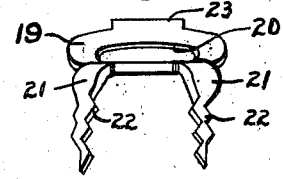
Fig. 11 is an end view of the fastener member shown in Figs. 9 and 10.
Figure 10:
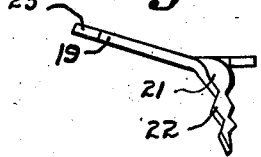
Fig. 10 is a side view of the fastener member shown in Fig. 9.

In Figs. 9 through 11 I have shown a second form of fastener member which is similar to my first form but distinguishable therefrom in certain respects. My second form of fastener member has a plate portion 19 providing an aperture 20 therein for receiving a shaft member. At one end of the plate 19 I have provided attaching portions in the form of prongs 21—21 which are adapted to be extended into openings in the material of a knob member. Opposed edges of the prongs 21—21 are provided with teeth 22 adapted to engage material of the member adjacent the prong-receiving openings so as to secure the fastener member to the knob in a manner similar to that by which my first form of fastener member is secured to a knob. The plate 19, in my second form of fastener member, is tipped so as to be in inclined relation relative to a face of the knob member to which it is to be secured with the result that the fastener member grips a shaft extended through the aperture 20 into the knob member by a canting action. Instead of providing my second form of fastener member with a releasing portion, such as the portion 17 described in connection with my first form of fastener member, I have provided an ear-like element 23 extending from an opposite end of the plate 19 from that with which the prongs 21—21 are integral and lying in substantially the plane of the plate 19, as most clearly shown in Fig. 10. The releasing portion 23 may be pressed either by a finger of the operator or a suitable tool in the direction of the article to which my second form of fastener is attached so as to align the aperture 20 with the shaft-receiving opening of the article for enabling the shaft to be released from the fastener.

Referring to Figs. 12 through 15 of the drawings, I have shown a third form of fastener member secured to one end of an article of manufacture such as the knob member 24. My preferred form of knob member 24 has a body portion providing an end face 25 at one end. An opening 26 (Fig. 12) in the form of a bore extends from the end face 25 into the body portion of the knob member in right-angular relation to the plane of the end face. The opening 26 has, in my preferred form, a cross-sectional shape substantially as shown in Fig. 12, a portion 27 of the opening being formed to snugly embrace an end of the shaft 3. Another portion 28 of the opening is adapted to receive and retain an attaching portion provided by the fastener member for securing the fastener member to the knob. A peripheral flange portion 29 may extend beyond the end face 25 of the knob member for concealing the fastener member when it is in permanent attachment with the knob. The flange 29 has an opening 30 in a side thereof, in my preferred form, to permit entrance of a tool through the flange for engagement with a releasing portion of the fastener member substantially in the manner described in connection with the installation illustrated in Figs. 1–5.

My third form of fastener member, which is clearly illustrated in Figs. 16–18 of the drawings, is formed of one piece of sheet metal material. The fastener member has a spring plate portion 31 and a loop portion 32 integral with one end of the plate portion. The material of the loop portion 32 extends out of the plane of the plate portion on one side thereof and then has a return bend portion 32ᵃ substantially engaging the other side of the plate portion, as most clearly shown in Fig. 18. At the free end of the portion 32 I have provided an attaching portion in the form of a prong 33 adapted to enter the prong-receiving opening 28 of the opening 26 for the purpose of securing the fastener member to the knob. The attaching prong 33 has teeth 34 on opposed edges presenting upwardly facing shoulders 35 (Fig. 17) which are adapted to engage material of the body portion of the knob member adjacent the opening 28 to prevent withdrawal of the prong means. It will be noticed that the plate portion 31 is disposed at such an angle relative to the attaching prong 33 that when the attaching prong is affixed within the knob member, the plate 31 will be inclined relative to the end face 25. The plate portion 31 has an aperture 36 therein for receiving an end of the shaft 3 whereby the plate may grip the shaft by a canting action. The aperture 36, in my preferred form, has a flat side substantially opposite the line of junction of the rod-receiving opening 27 and the prong-receiving opening 28 and is adapted to cooperate with a flat side 6 of the shaft 3 for preventing relative rotation of the parts after assembly of the same. At the opposite end of the plate 31 from that having the loop 32 I have provided an ear-like releasing portion 37 which curves out of the plane of the plate 31 on the same side of the plate as the prong 33. As a result of the curved construction of the releasing portion 37, a camming surface 38 (Fig. 14) is provided so as to cause contraction of the plate 31 when the camming surface is engaged by a suitable tool extended through the opening 30 of the peripheral flange 29. It will be noticed that the releasing portion 37 of my third form of fastener member does not extend into an opening in the body of the knob in the manner of the releasing portion 17 of my first form of fastener, but is disposed near enough to the end face 25 to allow its camming surface to be engaged by a tool means extended through the opening 30 of the peripheral flange.

Assembly of the component parts of my third form of fastener installation is a relatively simple matter and is carried out through first moving the prong 33 of the fastener member into the prong-receiving opening 28 of the knob until the return bend portion 32ᵃ of the loop 32 engages the end face 25 of the knob. When the prong 33 is in final position within the prong-receiving opening 28, the teeth 34 engage material of the knob member adjacent the opening to prevent withdrawal of the prong. When my third form of fastener member is secured to the knob, the plate portion 31 will be in inclined relation to the face 25 with the opening 36 of the plate portion slightly out of alignment with the opening 27 in the end face 25. Extension of the shaft 3 through the opening 36 causes the plate 31 to contract whereby the opening 36 aligns with the opening 27 of the knob so as to permit the free end of the shaft to extend through the inclined plate into the bore of the knob member. After pressure upon the shaft, for moving it into the bore of the knob, has been released, the plate 31 expands so that the material adjacent the aperture 36 grips the shaft by a canting action. The shaft 3 is now securely attached to the knob member. In releasing the shaft, a suitable tool is extended through the opening 30 of the flange 29 into engagement with the camming surface 38 thereby causing the plate 31 to contract in the direction of the end face 25 whereby the opening 36 aligns with the opening 27 to permit the shaft to be withdrawn from the fastener.

In Figs. 19 and 20 I have shown a fastener member having a slightly modified construction over my third form. In my modified form the prong 33 has an inwardly-extending flange portion 39. As a result of the flange portion 39, the prong 33 may be forced into final position within the opening 28 through means of a suitable tool (not shown) which, in operating position prior to securing the fastener to the knob, extends through the aperture 36 of the plate 31 and has its free end abutting the flange 39. It is understood that although the flange 39 may be an aid for securing the fastener member to the knob, I do not wish to be limited by this construction because the fastener member could be secured to a knob through any other suitable means. It will also be noticed that in the fastener illustrated in Figs. 19 and 20 the material of the loop portion 32 does not extend out of the plane of the inclined plate portion 31 on the side opposite to that on which the prong 33 is disposed.

Referring to Figs. 21 and 22 of the drawings, I have shown a fourth form of fastener member secured to a knob member 40 and having spring plate means gripping a shaft 3 for attaching the shaft to the knob. The knob member 40, which I have chosen for purposes of illustrating my invention, has a body portion with an end face 41 at one end thereof (Fig. 21). A peripheral flange 42 may extend from the end face 41 so as to aid in concealing the fastener member when the fastener is secured to the knob. The end face 41 has an opening 43 therein which has a flat side 44 (Fig. 22) for a purpose which will be described. The opening 43 preferably extends in right-angular relation to the end face 41 and is adapted to receive an attaching portion of the fastener member for securing the fastener to the knob and a shaft-supporting bearing adapted to snugly embrace a portion of the peripheral surface of the shaft 3.

My fourth form of fastener member, which is clearly illustrated in Figs. 23 and 24 of the drawings, is preferably formed of one piece of sheet metal material. The fastener member has an inclined spring plate portion 45 which is provided with a flat sided aperture 46 for receiving an end of the shaft 3 whereby the plate 45, in expanded position, may grip the shaft by canting action. At one end of the plate 45 I have provided a loop portion 47 having an inwardly-bent portion 48 at its free end extending beneath one side of the plate 45. As a means for securing the fastener member to the knob 40, I have provided an attaching portion 49 at the free end of the inwardly-bent portion 48. The attaching portion 49 has an outer flat surface adapted to engage the flat side 44 of the aperture 43 of the knob member, as most clearly shown in Figs. 21 and 22. On one edge of the attaching portion 49 I have provided teeth 50 (Figs. 21 and 23) adapted to engage material of the body of the knob portion adjacent the opening 43 for preventing removal of the attaching portion after it has been once moved into affixed position. Integral with the opposite edge of the attaching portion 49 from that having the teeth I have provided a side portion 51 which is of bowed cross-section (Fig. 22) so as to provide a bearing-like portion 52 adapted to embrace snugly a portion of the peripheral surface of the shaft 3, as most clearly shown in Fig. 22. The bearing-like portion 52 provides additional support for the shaft member and aids in taking up any strain which the fastener member might undergo if the knob installation were used with apparatus such as an electric switch device in which it would be desirable to subject the knob to rotary pressure for turning the shaft.

In assembling my fourth form of fastener member with an article of manufacture such as the knob 40, I move the attaching portion 49 and the bearing 52 into the opening 43 of the knob with the outer flat surface of the attaching portion adjacent the flat side 44 of the opening. Then pressure is exerted upon the fastener member to force the attaching portion into the opening until the inwardly-bent portion 48 of the fastener member abuts the end face 51 of the knob, as shown in Fig. 21. During passage of the attaching portion into the opening, the teeth 50 tend to dig into material of the knob adjacent the opening and engage with the material in a way to prevent withdrawal of the attaching portion. When the fastener member is permanently affixed with the knob member, as shown in Fig. 21, the plate portion 45 is in inclined relation to the end face 41 of the knob member and at the same time the aperture 46 of the plate 45 is disposed slightly out of alignment with the shaft-receiving opening defined by the inner surfaces of the attaching portion 49 and the bowed side portion 51. The shaft member 3 is now moved into the aperture 46 of the plate portion 45 with the flat side 6 of the shaft opposite the flat side of the aperture 46. As the shaft 3 is moved through the aperture 46 into the opening of the bearing 52, the pressure of the shaft causes the plate portion 45 to contract whereby the aperture 46 is brought into substantial alignment with the opening provided by the bearing 52 so as to permit the passage of the shaft into the bearing until the outermost free end of the shaft abuts the body of the knob closing the lower end thereof. After the shaft has been moved into this position the plate portion 45 expands whereby material of the plate portion adjacent the aperture 51 engages the shaft by a canting action to secure the shaft to the knob. The shaft may be easily and quickly released from the knob by passing a tool beneath the knob to press the ear 53 adjacent an end of the plate in the direction of the end face 41 thereby moving the aperture 46 into substantial alignment with the opening of the bearing 52 whereby the shaft may be readily detached.

Thus by my invention I have provided fastener installations, each of which comprises, in my preferred form, a preformed knob member of inexpensive construction and a simple fastener member capable of being quickly and easily secured to the knob member so as to provide an efficient means for detachably attaching a shaft to the knob.

In the claims I have referred to the knob 1, 24 and 40 as an operating member. By that term I intend to include a member operated by a shaft as well as the member for operating the shaft.

Although I have illustrated and described preferred embodiments of my invention, I do not wish to be limited thereby because the scope of my invention is best defined by the following claims.

1. In combination with a shaft and an operating member on one end thereof, of a fastener member for securing said member to said shaft, said fastener member having a plate-like apertured portion surrounding and normally gripping said shaft as when biased with respect to a transverse plane through said shaft, means integral with said plate-like portion for attaching said fastener to said member, a part of said fastener connecting said attaching means to said shaft-gripping portion being angularly disposed with reference to the latter and bearing against said operating member.

2. In combination with a shaft and an operating member on one end thereof, of a fastener member for securing said member to said shaft, said fastener member having a plate-like apertured portion surrounding and normally gripping said shaft as when biased with respect to a transverse plane through said shaft, and an integral attaching portion connected to and disposed at an obtuse angle with respect to said shaft-gripping portion.

3. In combination with a shaft and an operating member on one end thereof, of a fastener member for securing said member to said shaft, said fastener member having a plate-like apertured portion surrounding and normally gripping said shaft as when biased with respect to a transverse plane through said shaft, an integral attaching portion connected to and disposed at an obtuse angle with respect to said plate-like shaft-gripping portion adapted to be embedded in said operating member adjacent said shaft, a part of said fastener connecting said shaft-gripping portion and said attaching portion bearing against said operating member.

4. A fastener installation comprising in combination, a shaft and operating member on one end thereof and a fastener member for removably securing said operating member to said shaft, said operating member being formed with a peripheral flange on one face thereof enclosing a fastener receiving-means and a shaft-receiving bore opening into said receiving means, said fastener being formed with a shaft-gripping portion surrounding and normally gripping said shaft as when biased with respect to a transverse plane through said shaft, an integral attaching portion embedded in said member, a part of the fastener connecting said shaft-gripping and attaching portions being angularly disposed with reference to the latter and bearing on said operating member, and means on said fastener extending into a recess in said peripheral flange operative to release the shaft-gripping portion of the fastener from gripping engagement with the shaft.

5. A fastener installation comprising in combination, a shaft and operating member on one end thereof and a fastener member for removably securing said operating member to said shaft, said operating member being formed with a peripheral flange on one face thereof enclosing a fastener-receiving means and a shaft-receiving bore opening into said receiving means, said fastener being formed with a shaft-gripping portion surrounding and normally gripping said shaft as when biased with respect to a transverse plane through said shaft, an integral attaching portion embedded in said member, a part of the fastener member connecting said shaft-gripping and attaching portions being angularly disposed with reference to the latter and bearing on said operating member, and an extension on the shaft-gripping portion extending within a recess in the peripheral flange of the operating member by means of which the shaft-gripping portion of the fastener may be released from gripping engagement with the shaft.

6. A fastener member for connecting a shaft with an apertured operating member and the like, comprising an apertured spring plate portion adapted to surround and grip the shaft, an attaching portion integral with one end of the plate portion and disposed normally at an obtuse angle with reference to the apertured portion of said plate, said attaching portion being adapted to be embedded in the material of said operating member.

7. A fastener member for connecting a shaft with an apertured operating member and the like, comprising an apertured spring plate portion adapted to surround and grip the shaft, an attaching portion integral with one end of the plate portion and disposed normally at an obtuse angle with reference to the apertured portion of said plate, said attaching portion being adapted to be embedded in the material of said operating member, the end of said plate portion remote from the attaching portion being formed with an integral ear-like releasing projection.

8. A fastener member for connecting a shaft with an apertured operating member and the like, comprising an apertured spring plate portion adapted to surround and grip the shaft, an attaching prong integral with one end of the plate portion and angularly disposed with reference to the apertured portion of the plate and in a plane adjacent one edge of the aperture in said plate.

9. A fastener member for connecting a shaft with an apertured operating member and the like, comprising an apertured spring plate portion adapted to surround and grip the shaft, an attaching prong integral with one end of the plate portion and angularly disposed with reference to the apertured portion of the plate and in a plane adjacent one edge of the aperture in said shaft, an angular extension on the upper end of said attaching prong in axial alignment with the aperture of said shaft-gripping plate portion.

10. A fastener member for connecting a shaft with an apertured operating member and the like comprising an apertured spring plate and an angularly disposed attaching prong integral with said plate and disposed in a plane passing through one edge of the plate aperture, and a reversely bent loop portion connecting the plate and attaching prong, the portion of the plate having said aperture being disposed at an obtuse angle relative to said attaching prong.

11. A fastener member for connecting a shaft with an apertured operating member and the like comprising an apertured spring plate and an angularly disposed attaching prong integral with said plate and disposed in a plane passing through one edge of the plate aperture, and a reversely bent loop portion connecting the plate and attaching prong, the portion of the plate having said aperture being disposed at an obtuse angle relative to said attaching prong, and a projection on the end of the plate opposite the loop portion for enabling said plate to be moved about said loop portion as a pivot.

12. A fastener member for connecting a shaft with an apertured operating member and the like comprising an apertured spring plate and an angularly disposed attaching prong integral with said plate and disposed in a plane passing through one edge of the plate aperture, and a reversely bent loop portion connecting the plate and attaching prong, the portion of the plate having said aperture being disposed at an obtuse angle relative to said attaching prong, and a projection on the end of the plate opposite the loop portion for enabling said plate to be moved about said loop portion as a pivot, and an angular extension on the upper end of the attaching prong in axial alignment with the aperture in said spring plate portion.

HOWARD J. MURPHY.